June 28, 1960 R. J. THORPE ET AL 2,942,418
SPEED RESPONSIVE FUEL CONTROL FOR GAS TURBINE
ENGINE WITH ACCELERATION AND COMPRESSOR
OUTPUT PRESSURE MODIFICATION
Filed July 27, 1956
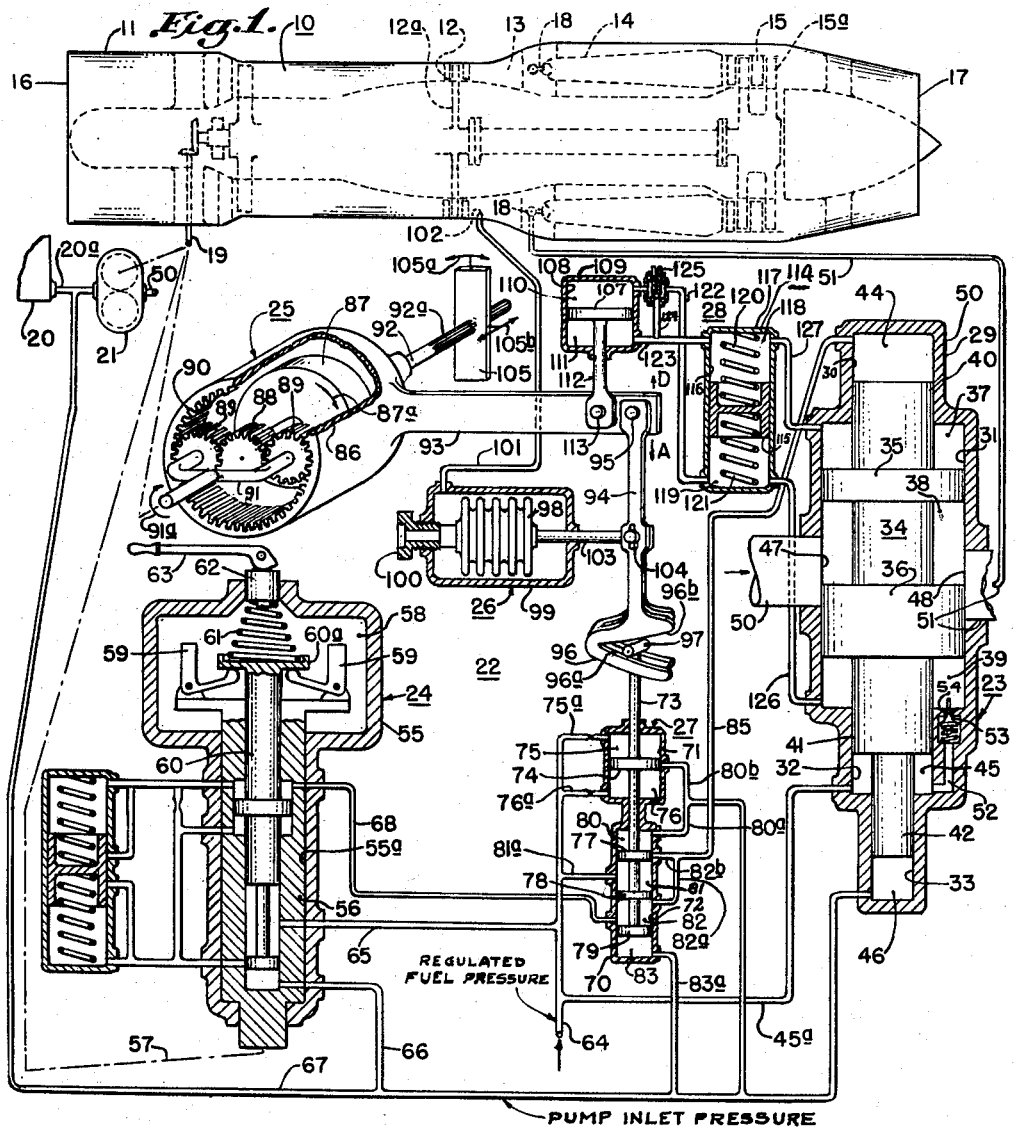
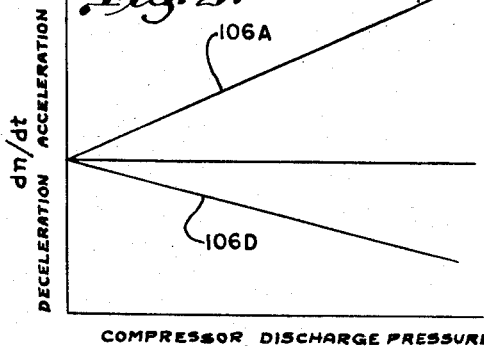
INVENTORS
Robert J. Thorpe
Donald F. Winters
BY
Frank Critsio Jr.
Agent United States Patent Office 2,942,418
Patented June 28, 1960

2,942,418

SPEED RESPONSIVE FUEL CONTROL FOR GAS TURBINE ENGINE WITH ACCELERATION AND COMPRESSOR OUTPUT PRESSURE MODIFICATION

Robert J. Thorpe, Shawnee, and Donald F. Winters, Overland Park, Kans., assignors to Westinghouse Electric Corporation, East Pittsburgh, Pa., a corporation of Pennsylvania Filed July 27, 1956, Ser. No. 600,474

6 Claims. (Cl. 60—39.28)

This invention relates to controls for gas turbines, more particularly to an acceleration-deceleration control therefor, and has for an object to provide an improved yet highly simplified control of the above type.

When a speed governor is employed for controlling the fuel supplied to a gas turbine engine, for example, an aviation turbo-jet engine, it is necessary to limit the maximum fuel available to the engine during an acceleration from an existing speed to a higher speed setting in order to avoid over-heating the turbine and/or to avoid the phenomenon known as "compressor surge." It is also necessary to limit the minimum fuel available during a deceleration from an existing speed to a lower speed setting in order to avoid the phenomenon known as "combustion blow-out." These limits are established by the characteristics of the engine.

Without such a control, the governor would sense an underspeed condition when the speed setting is suddenly increased and cause the governor controlled fuel metering valve to move to its maximum open position in an effort to increase engine speed. Such an action would result in overfueling the engine and cause the compressor to surge. Conversely, sudden reduction of the engine speed setting would cause the fuel metering valve to close in order to decrease the speed of the engine and thus cause "combustion blow-out" because of insufficient fuel delivery to the engine.

The above acceleration and deceleration problems encountered in aviation gas turbine speed governor controls have heretofore been solved by computer mechanisms which sense and combine various compressor functions such as inlet pressure, outlet pressure and inlet temperatures, with engine speed. These computers are either quite complicated or fail to satisfy all ambient and flight conditions.

In view of the above, it is another object of the invention to provide an acceleration-deceleration control for a gas turbine engine, in which means for sensing rate of change of engine speed is employed with means for sensing compressor outlet pressure in a manner to modify the signal of a speed governor to the engine fuel metering valve whenever the governor senses sufficient speed error to overfuel or underfuel the engine.

A further object of the invention is to provide an acceleration-deceleration control provided with means for anticipating acceleration or deceleration of the engine to prevent initial overshoot of the fuel metering valve in response to a change in the speed setting of the governor.

A more specific object is to provide an acceleration-deceleration control employing a servo valve mechanism interposed between the speed governor and the fuel metering valve, in which the servo mechanism is controlled jointly by an acceleration-deceleration sensing means, a compressor outlet pressure sensing means and/or means for anticipating acceleration or deceleration of the engine.

Briefly, the invention provides a fuel control system for a gas turbine engine comprising an acceleration-deceleration responsive means for sensing the rate of change of engine speed ($dn/dt$), the output of which is modified by the movement of a pressure responsive means for sensing the compressor outlet pressure (P) to provide a joint signal for modifying the signal of the engine speed governor in such a manner that the fuel metering valve is prevented from moving to the fully open position when the power lever is quickly moved to a position demanding acceleration of the engine. Conversely, the joint $dn/dt$ and P signal is effective to modify the signal of the speed governor, when the power lever is moved to a position requiring deceleration to prevent full closure of the fuel metering valve.

The joint $dn/dt$ and P signal is imposed on a self-centering servo valve mechanism which is interposed between the speed governor and the fuel metering valve.

In addition to the above, one of the principal features of the invention resides in provision of an acceleration-deceleration anticipating mechanism for initially controlling the self-centering servo mechanism during the first instant after the speed setting is changed, wherein the $dn/dt$ value is zero and the P value is unchanged. The acceleration-deceleration sensing mechanism is thus effective to prevent fully-open and fully-closed fuel metering valve positions of a transient yet harmful nature.

In the event of a fuel interruption, the fuel metering valve would normally move to the fully open position, since the speed governor would sense the resulting reduced engine speed and the $dn/dt$ sensing means would be ineffective to provide a signal for limiting the opening movement of the fuel metering valve. Means including a valve actuated by such movement of the fuel metering valve is provided for emergency operation of the acceleration-deceleration anticipating mechanism during such conditions, so that when engine fuel flow is resumed, it is effectively limited by the anticipating mechanism.

These and other objects are effected by the invention as will be apparent from the following description and claims taken in connection with the accompanying drawings, forming a part of this application, in which:

Fig. 1 is a composite diagrammatic view showing a typical aviation turbojet engine provided with a control system embodying the invention, the elements of the control system being of greatly exaggerated size with respect to the engine for the sake of clarity; and, Fig. 2 is a chart illustrating a set of acceleration and deceleration curves for a turbojet engine, attained with the invention.

Referring to Fig. 1 of the drawing in detail, there is shown a side elevation of a turbojet engine 10 with its various operating components in dotted lines. The engine comprises the usual outer cylindrical shell 11 housing a compressor section 12, a diffuser section 13, fuel combustion apparatus 14 and a gas driven turbine section 15. An air inlet opening 16 is provided at the front or left end of the engine while an exhaust nozzle 17 is provided at the rear or right hand end of the engine. The turbine rotor 15a is connected to the compressor rotor 12a; so that, in operation, as the turbine rotor is driven by the hot motive combustion gases generated in the combustion apparatus 14 by combustion of fuel introduced thereto by fuel injecting means 18, the compressor rotor 12a is also driven to provide compressed air for the engine. The combustion gases are then exhausted through the exhaust nozzle 17 in a jet stream to provide a forward propulsive thrust to the engine. The forward end of the compressor rotor 12a is provided with a geared power take-off shaft 19 for driving the various engine driven accessories and control elements.

The fuel is supplied from a fuel tank 20 having an outlet conduit 20a communicating with an engine driven pump 21, which as illustrated may be of the positive displacement type, for pumping the fuel to the fuel injecting means 18, as required, under control of a fuel control system, generally designated 22, provided in accordance with the invention.

The fuel control system 22 comprises the following major components: a valve 23 for metering fuel to the turbojet engine; a manually variable speed governor 24 driven by the turbojet engine, for controlling the fuel metering valve 23; an engine driven acceleration-deceleration responsive means 25 for sensing rate of change of engine speed ($dn/dt$); a pressure responsive element 26 for sensing compressor outlet pressure (P); a self-centering servo valve mechanism 27 and an acceleration-deceleration anticipating device 28.

The fuel metering valve 23 has a housing 29 providing a plurality of axially aligned cylindrical bores 30, 31, 32 and 33, within which is slidably received a piston valve member 34 having spaced lands 35 and 36 received within bore 31 and dividing the latter into a plurality of chambers 37, 38 and 39. The piston valve member is further provided with cylindrical portions 40, 41 and 42 received in bores 30, 32 and 33, respectively, and cooperating therewith to form chambers 44, 45 and 46, respectively. In the housing 29, a fuel inlet port 47 and a fuel outlet port 48 are provided, communicating with the chamber 38. The outlet fuel port 48 is a fuel metering port and is controlled by the valve land 36. The fuel inlet port 47 communicates with a fuel supply conduit 50 communicating with the fuel pump 21 while the fuel outlet port 48 communicates with a fuel delivery conduit 51 communicating with the engine fuel injecting means 18. Between the valve chambers 45 and 39 there is a communicating passageway 52 controlled by a normally closed, spring biased valve member 53 extending through a port 54 into the chamber 39.

The speed governor 24 may be of any suitable hydraulic governing pressure type. In the example illustrated, the speed governor is of a well known design and is provided with a stationary housing 55 having a longitudinal cylindrical bore 55a within which is rotatably received an axially bored spindle structure 56 driven by the engine power take-off shaft 19 (connection indicated by dot-and-dash line 57). The upper part of the governor housing together with the spindle 56 provides a chamber 58 within which is disposed speed responsive structure including a pair of flyweights 59 carried by the spindle and pivoted thereto. Centrally disposed in the chamber is a slidable piston valve member 60 having an upper bearing portion 60a for the inner ends of the flyweights 59. The piston valve member 60 is biased downwardly by a helical speeder spring 61 which is compressible to varying degrees by a plunger 62 interposed between a manually movable power lever 63 and the spring. As well known in the art, various increased speed settings for the governor are attained by moving the plunger 62 downwardly, while decreased speed settings are attained by moving the plunger upwardly.

Liquid at a regulated pressure, preferably fuel tapped from the fuel conduit 50 and maintained at a constant pressure by suitable pressure regulating means (not shown) is admitted to the governor 24 by a main conduit 64 and conduit 65 branching therefrom. Also, a conduit 66 connected to a region of reduced pressure relative to the regulated pressure, for example, to a main conduit 67 communicating with the conduit 20a at the inlet of the fuel pump 21, is provided. A portion of the regulated pressure is bled thereto within the governor, as required, to modify the former in a well known manner, to provide a variable governing fluid pressure delivered by an output conduit 68 to the self-centering servovalve mechanism 27. This governing fluid pressure is utilized to control the position of the fuel metering valve 23, as will subsequently be described.

The self-centering servo valve mechanism 27 comprises a housing 70 having axially aligned cylindrical bores 71 and 72. An axially slidable piston valve member 73 is received within the housing 70 and is provided with a valve land 74 dividing bore 71 into chambers 75 and 76, and valve lands 77, 78 and 79 dividing bore 72 into chambers 80, 81, 82 and 83.

Chambers 75, 76 and 81 are connected by branch conduits 75a, 76a and 81a, respectively, to the regulated fuel pressure conduit 64, while chambers 80 and 83 are connected by branch conduits 80a and 83a to the pump inlet pressure conduit 67. A branch conduit 80b connected to conduit 80a serves to bleed either of chambers 75 and 76, depending on the position of the valve land 74. In the steady state position shown, conduit 80b is blocked by valve land 74. Chamber 82 communicates with the governing pressure conduit 68 from the speed governor, and has a branch conduit 82a connected to a conduit 85 which, in turn, communicates with chamber 44 of the fuel metering valve 23; so that during the steady state condition the fuel metering valve is controlled by governing fluid pressure from the speed governor 24. A second branch conduit 82b normally blocked by valve land 77 communicates with conduit 85.

The position of the servo valve mechanism is controlled primarily by the joint signal from the $dn/dt$ responsive means 25 and the P responsive element 26 in such a manner that when the turbojet engine is in an accelerating state the valve member 73 is displaced downwardly from the steady state position viewed in the drawing. Conversely, when the engine is in a decelerating state the valve member 73 is displaced upwardly from the steady state position.

The $dn/dt$ responsive means 25 comprises a housing 86 having an inertia wheel 87 rotatably mounted therein and carrying a centrally disposed driving gear 88. A pair of planetary pinions 89, interposed between and in meshing relation with the gear 88 and a ring gear 90 provided in the housing 86, are connected to each other for joint rotation by a yoke 91 which is, in turn, driven by the power take-off shaft 19 of the engine. The housing 86 is mounted upon a central torsion shaft 92, so that rotation of the housing is resisted by torsion loading of the shaft. Thus, as the planetary pinions 89 are driven by the engine at a speed corresponding to the speed thereof, the inertia wheel 87 is driven by its driving gear 88 in the direction indicated by arrow 87a which is in the same direction as that of yoke 91, indicated by arrow 91a. During steady speed conditions, the housing 86 assumes a stable stationary position determined by the momentum of the inertia wheel and the spring constant of the torsion shaft 92. However, upon increase in speed of the engine and, accordingly, increase in speed of the planetary pinions 89, such increase is resisted by the momentum of the inertia wheel 87, so that the housing rotates through a small angular increment of movement in the same direction as that of the inertia wheel. Conversely, decrease in engine speed is accompanied by an increment of rotation of the housing counter to the direction of the inertia wheel, since deceleration is also resisted by the momentum of the inertia wheel. The acceleration-deceleration signal thus provided by the housing 86 is amplified by an arm 93 integral with or otherwise attached to the housing, the direction of movement of which is indicated by arrows A and D to designate acceleration and deceleration, respectively.

The movement of arm 93 is transmitted to the servo mechanism 27 by a forked link member 94 pivoted to the arm 93 at 95 and having a split fork portion 96 receiving a cross pin 97 attached to the piston valve member 73. Thus, upon acceleration, the piston valve member moves downwardly while upon deceleration the piston valve member is moved upwardly.

The movement of the forked link member is modified by the P responsive element 26. As illustrated the P responsive element is of the absolute pressure responsive type and comprises an evacuated bellows 98 disposed within a sealed housing 99 and adjustably fixed therein by adjusting means 100. The housing 99 has a conduit 101 communicating with a pressure probe 102 disposed at the outlet of the engine compressor 12, so that the bellows 98 expands and contracts in response to variations in the absolute compressor outlet pressure P. Such expansion and contraction is transmitted to the forked link member 94 by an axially movable rod 103 attached to the bellows 98 and extending through the housing. The rod 103 is disposed substantially normal to the forked link member 94 and is pivotally attached thereto at an intermediate vertically slotted portion by a pin 104, so that the P signal is effective to move the forked link member through an angular increment about the pivotal connection 95. The split fork portion 96 is provided with opposed pairs of cam surface portions 96a and 96b between which the cross pin 97 is disposed, so that the piston valve member 73 is movable in both upward and downward directions by the composite vertical and angular movement of the forked link 94, as will be later described. However, when the valve member 73 is in the balanced position, the cross pin 97 is out of engagement with cam surfaces 96a and 96b.

The $dn/dt$ responsive device 25 may be provided with suitable adjusting means including a movable support member 105 through which a splined portion 92a of the torsion shaft 92 extends. Zero positioning is attainable by rotating the support member 105 in the proper direction, as indicated by the double-headed arrow 105a, to raise or lower the arm 93; while range of movement is attained by movement of the support member 105 in the proper axial direction as indicated by the double-headed arrow 105b to modify the effective length of the shaft 92 subjected to torsion.

Referring to Fig. 2, wherein a chart is shown plotting compressor discharge pressure valves (P) as abscissa against acceleration values of $dn/dt$ as ordinates, it will be seen that a limiting curve 106A is attained, which in this instance is a straight line of constant slope. The curve 106A defines the engine limits of operation for all flights or static conditions, so that "compressor surge" operating conditions and/or engine over temperature conditions are avoided. On the same chart, deceleration values of $dn/dt$ are also plotted against P values to provide a limiting surve 106D of constant slope within the engine limits of operation to avoid "combustion blow-out" conditions.

During steady state operation, the servo valve mechanism is in the position shown and the fuel valve 23 is controlled by governing fuel pressure through conduit 68, servo valve chamber 82, branch conduit 82a, conduit 85 and fuel valve chamber 44, balanced by regulated fuel pressure in the conduit 45a and fuel valve chamber 45. The regulated fuel pressure is higher than the governing fuel pressure but acts on a smaller area of the fuel valve, so that the fuel valve is in a partially open position, that is, land 36 is displaced downwardly to permit fuel from the supply conduit 50 to flow through the delivery conduit 51 in sufficient quantity to maintain steady speed of the engine at the selected variable governor speed setting.

As thus far described, the fuel control operates as follows during engine acceleration conditions, attainable by the simple maneuver of moving the power lever 63 clockwise to a higher speed setting. The speed governor immediately senses an underspeed condition and augments the prevailing governor pressure existing in conduit 68, servo mechanism chamber 82, branch conduit 82a, conduit 85 and fuel valve chamber 44, by admission of additional regulated fuel pressure thereto through conduit 65 in an effort to drive the fuel metering valve to the wide open position. However, as the fuel valve 23 admits more fuel to the engine, the speed thereof is accelerated and sensed by the $dn/dt$ sensing device 25 which moves forked link member 94 downwardly causing engagement of cam surface 96b with cross pin 97 which, in turn, moves the servo valve member 73 downwardly. Also, the P value at the compressor outlet is increased, thereby causing the bellows rod 103 to move to the left, thereby effectively positioning the cam surface 96b with the cross pin 97 and permitting further downward movement of the valve member 73 to a position in which the valve land 78 blocks branch conduit 82a, thereby cutting off admission of governing fuel pressure to fuel valve chamber 44. Valve land 77 is concomitantly moved to a position in which governing fuel pressure from the fuel valve chamber 44 is bled through conduit 85, branch conduit 82b, valve chamber 80 and branch conduit 80a to the pump inlet pressure conduit 67. As the governing pressure in fuel valve chamber 44 is decreased, the fuel valve 23 is prevented from opening wide, thereby limiting flow of fuel to the engine and limiting the acceleration thereof to a value at which compressor surge is avoided, as defined by curve 106A. As the servo valve member 73 is displaced downwardly, the valve land 74 unblocks the branch conduit 80b and bleeds regulated pressure from servo valve chamber 75 through branch conduit 80b to the conduit 67, thereby creating an unbalanced pressure condition which tends to restore the servo valve member 73 to its original position. Thus, at the cessation of an acceleration period, the forked link member 94 returns to its neutral position as shown in the figure and control of the fuel valve 23 is transferred once again to the governor 24.

When it is desired to reduce the speed of the engine, the power lever 63 is moved counterclockwise to provide a lower speed setting for the governor 24. The speed governor senses an overspeed condition and reduces the value of governing pressure in conduit 68 by bleeding a portion thereof through conduit 66 to the pump inlet pressure conduit 67 in an effort to close the fuel valve 23 by reduction of governing pressure in fuel valve chamber 44. However, as the fuel valve admits less fuel to the engine, the speed thereof is decelerated. The deceleration is sensed by the $dn/dt$ sensing device 25 which, in turn, moves the arm 93 upwardly in the direction of arrow D and causes the forked link member 94 to move upwardly accordingly. This movement causes engagement of cam surface 96a with cross pin 97 and moves the servo valve member 73 upwardly. The P value at the compressor outlet is likewise decreased and causes expansion of the bellows 98 in the P sensing device, thereby moving the forked member 94 to the right, whereby the cam surfaces 96a provide a further lifting increment to establish the engine deceleration limits of curve 106D. The servo valve member 73 is thus moved upwardly to a position in which valve land 77 uncovers branch conduit 82b and permits flow of augmenting regulated pressure from conduit 64 through branch conduit 81a, chamber 81, branch conduit 82b and conduit 85 to the fuel valve chamber 44. The valve land 79 is concomitantly moved upwardly to a position in which it partially blocks governing pressure conduit 68 to prevent escape of fluid from chamber 82, thereby preventing complete closure of the fuel valve 23 and permitting sufficient fuel to flow to the engine to prevent "combustion blowout." Concomitantly therewith, the servo valve land 74 is displaced upwardly, bleeding regulated pressure from servo valve chamber 76 through branch conduit 80b to the pump inlet pressure conduit 67, whereby the regulated pressure existing in servo valve chamber 75 is sufficient to displace the servo valve member 73 to its normal position upon reduction of the $dn/dt$ and P signal, and restore control of the fuel valve to the governor.

As described above, when the power lever is advanced to a higher speed setting, the governor immediately senses an underspeed condition and provides an immediate increase in governing pressure to drive the fuel valve open. However, the $dn/dt$ and P signals override the governor signal to limit the opening travel of the fuel valve in a manner to provide the acceleration schedule shown in curve 106A of Fig. 2. Since the engine acceleration $dn/dt$ and compressor outlet pressure P increases are caused by increase of fuel supply to the engine, it is reasonable to assume that the fuel valve can initially be driven to the wide open position before the acceleration $dn/dt$ and P values can attain a sufficient magnitude to limit the fuel valve travel. It is also assumed that when the power lever is moved to a lower speed setting the fuel valve can be driven to the fully closed position for a short period before the deceleration $dn/dt$ and P values attained are adequate to limit the travel of the fuel valve in closing direction.

Accordingly, a further important feature of the invention resides in provision of the acceleration-deceleration anticipating device 28 for controlling the self-centering servo valve mechanism 27 during the brief period immediately following movement of the power control lever in which the $dn/dt$ signal is zero or of such small magnitude that it is incapable of providing the required overriding control. The $dn/dt$ anticipating device 28 is hydraulically actuated and comprises an actuating piston 107 slidably received in a cylindrical bore 108 provided in a housing 109 and dividing the bore into chambers 110 and 111. The piston has an actuating rod 112 extending through the housing 109 and pivotally connected at 113 to the arm 93 of the $dn/dt$ responsive device. A buffer device 114 comprising a piston 115 slidably received in the cylindrical bore 116 of a housing 117 and dividing the bore 116 into chambers 118 and 119, is further provided. The buffer piston 115 is positioned in the bore 116 by a pair of opposed helical springs 120 and 121, so that when the fluid pressure in chambers 118 and 119 is equal, the buffer piston is in the central position shown.

Buffer chamber 119 is connected to the actuator chamber 110 by a conduit 122, while buffer chamber 118 is connected to the actuator chamber 111 by a conduit 123. Also, conduits 123 and 122 are connected to each other by a bypass conduit 124 having a suitable needle valve 125 cooperating therewith to provide a variable restriction to fluid flow through the bypass conduit.

The buffer chamber 119 is also connected to chamber 39 of the fuel metering valve 23 by a conduit 126, while buffer chamber 118 is connected to the fuel valve chamber 37 by a conduit 127.

The $dn/dt$ anticipating device 28 operates in the following manner during an acceleration cycle. Upon movement of the power lever 63 to an increased speed setting, the governor 24 senses an underspeed condition and, in the manner previously described, provides increased governing fluid pressure to chamber 44 of the fuel valve through conduit 68, servo mechanism chamber 82, bypass conduit 82a and conduit 85. The fuel valve member 34 is immediately driven downwardly toward the fully open position. However, such movement compresses the fluid in fuel valve chamber 39, and the increased pressure is transmitted to the lower buffer chamber 119 by the conduit 126, driving the buffer piston 115 upwardly against the bias of spring 120. The thus pressurized fluid flows through conduit 122 into the actuator chamber 110 to force the piston 107 and its rod 112 downwardly; thereby moving the arm 93 downwardly in the direction of the arrow A. The arm 93, in the usual manner previously described, drives the valve member 73 of the self-centering servo mechanism 27 downwardly to provide the required overriding control, by blocking the flow of governing fluid to branch conduit 82a and bleeding excess governing fluid from the fuel valve chamber 44 through conduit 85 and branch conduit 82b to the pump inlet conduit 67. During this sequence of events, the excess fluid in actuator chamber 111 flows through conduit 123, buffer chamber 118 and conduit 127 into the expanding chamber 37 of the fuel valve. Also, as the fluid pressure in fuel valve chamber 44 is relieved, the fuel valve is prevented from moving to its wide open position.

However, as increased fuel is delivered to the engine 10, the speed thereof is accelerated and sensed by the $dn/dt$ responsive device. Also, the compressor output pressure increases and is sensed by the P responsive element, whereupon control of the servo mechanism is assumed by the $dn/dt$ responsive device and the P responsive element, in the manner previously described. As control is thus assumed by the $dn/dt$ responsive device and the P responsive device, the highly pressurized fluid in the actuator chamber 110 is gradually bled by restricted flow past the needle valve 125 and bypass conduit 124 into the actuator chamber 111 and buffer chamber 118 to restore the $dn/dt$ anticipating device 28 to its original position of equilibrium.

In the event of a fuel interruption during an acceleration cycle, the fuel valve 23 will move to the fully open position, since the governor will sense an underspeed condition and provide an increase in pressure of the governing fluid in fuel valve chamber 44, although a limiting signal cannot be provided by the $dn/dt$ responsive device, since the engine is not accelerating. With a resumption of fuel flow, the wide open fuel valve would probably cause the compressor to surge. However, valve 53 provided between fuel valve chambers 39 and 45 prevents such an occurrence in the following manner. As the fuel valve member 34 is driven to the fully open position under the conditions described above, valve 53 is depressed by the land 36 and opens the port 54, thereby admitting regulated pressure from fuel valve chamber 45 and passageway 52 into the fuel valve chamber 39 to oppose the governing pressure in chamber 44. The regulated pressure is also delivered through conduit 126 to the buffer chamber 119 of the $dn/dt$ anticipating device 28 and thence to the actuator chamber 110 to provide a maximum acceleration anticipation. Hence, when engine fuel flow is finally resumed, it is effectively limited to prevent "compressor surge."

During a deceleration cycle, the $dn/dt$ anticipating device operates in substantially the converse manner. Upon movement of the power lever 63 to a decreased speed setting, the governor 24 senses an overspeed condition and, in the manner previously described, decreases the governing fluid pressure in fuel valve chamber 44. The fuel valve member is immediately driven upwardly toward the fully closed position by the preponderant regulated fluid pressure in fuel valve chamber 45. However, such movement relieves the fluid pressure in fuel valve chamber 39 and increases the fluid pressure in fuel valve chamber 37. The increased fluid pressure in chamber 37 is transmitted to the upper buffer chamber 118 by the conduit 127, driving the buffer piston 115 downwardly against the bias of the spring 121. The increased fluid pressure also flows through conduit 123 into the lower actuator chamber 111 to force the piston 107 upwardly, whereupon the arm 93 of the $dn/dt$ sensing device is moved upwardly with a resultant upward following movement of the servo valve member 73 to temporarily provide the required overriding control. During this sequence of events, the excess fluid in actuator chamber 110 flows through conduit 122, buffer chamber 119 and conduit 126 into fuel valve chamber 39.

As previously described, with the servo valve member 73 displaced upwardly, fluid from the regulated pressure conduit 64 and conduit 81a is delivered to the fuel valve chamber 44 to prevent complete closure of the fuel valve.

As the fuel supply to the engine is thus decreased, the speed thereof is decelerated and sensed by the $dn/dt$ responsive device. Concomitantly the reduced compressor output pressure is sensed by the P responsive element, whereupon control is assumed by the $dn/dt$ responsive device and the P responsive element. As control is thus assumed, the highly pressurized fluid in the actuator chamber 111 is gradually relieved by restricted flow through the bypass conduit 124 and past the needle valve 125, into the actuator chamber 110 and buffer chamber 119 to restore the $dn/dt$ anticipating device to its original position of equilibrium.

It will now be seen that the invention provides a fuel control system for a gas turbine which effectively limits the maximum and minimum fuel flow requirements of the engine in a manner to prevent damage to the compressor during an acceleration cycle, as well as to prevent the possibility of "combustion blowout" during a deceleration cycle.

The invention further provides the above limiting control in a simple and straightforward manner, employing engine parameters which have been found to accurately determine the performance of the engine and which may be utilized by relatively simple yet reliable sensing devices.

It will further be seen that the fuel control overcomes the lag or delay between selection of a speed setting on the governor and response of the $dn/dt$ responsive device and P responsive element, by employment of a means for anticipating the direction of their response and imposing a brief overriding signal on the governor actuated fuel valve during such lag period.

While the invention has been shown in but one form, it willl be obvious to those skilled in the art that it is not so limited, but is susceptible of various changes and modifications without departing from the spirit thereof.

What is claimed is:

1. Fuel control apparatus for a gas turbine engine having a turbine rotor, fuel combustion apparatus for supplying said turbine rotor with hot motive fluid, means for providing said combustion apparatus with fuel and a compressor including a rotor for supplying combustion air thereto, said rotors being connected to each other for joint operation, comprising: a fuel metering valve for regulating fuel flow to said combustion apparatus, a speed governor driven by one of said rotors for controlling the position of said fuel metering valve, means for regulating the speed setting of said speed governor to vary the speed of said rotors, acceleration-deceleration sensing means driven by said rotors for providing a rate of change of speed signal ($dn/dt$), fluid pressure responsive means for sensing the air pressure (P) at the outlet of said compressor and adjustable means controlled by said $dn/dt$ sensing means and said P sensing means, said adjustable means being interposed between said governor and said fuel metering valve and operative to modify the control effect of said governor when said governor is adjusted to a different speed setting by said regulating means, said P sensing means being arranged to oppose the control effect of said governor on said adjusting means, thereby to prevent said fuel metering valve from opening wide when the compressor outlet air pressure is increasing and to prevent said fuel metering valve from completely closing when the compressor outlet air pressure is decreasing.

2. Fuel control apparatus for a gas turbine engine having a turbine rotor, fuel combustion apparatus for supplying said turbine rotor with hot motive fluid, means for providing said combustion apparatus with fuel and a compressor including a rotor for supplying combustion air thereto, said rotors being connected to each other for joint operation, comprising: a fuel metering valve for regulating fuel flow to said combustion apparatus, a speed governor driven by one of said rotors for controlling the position of said fuel metering valve, means for regulating the speed setting of said speed governor to vary the speed of said rotors, acceleration-deceleration sensing means driven by said rotors for providing a rate of change of speed signal ($dn/dt$), fluid pressure responsive means for sensing the air pressure (P) at the outlet of said compressor and adjustable mechanism controlled by said $dn/dt$ sensing means and said P sensing means, said adjustable mechanism being interposed between said governor and said fuel metering valve and operative to modify the control effect of said governor when said governor is adjusted to a different speed setting by said regulating means, said fuel metering valve being movable in opening direction by pressurized liquid delivered thereto by said speed governor, said adjustable mechanism comprising a movable valve member connected to said $dn/dt$ sensing means and said P sensing means and controlled thereby to decrease the value of the pressurized liquid when the compressor outlet air pressure is increased and to increase the value of the pressurized liquid when the compressor outlet air pressure is decreased.

3. Fuel control apparatus for a gas turbine engine having a turbine rotor, fuel combustion apparatus for supplying said turbine rotor with hot motive fluid, means for providing said combustion apparatus with fuel and a compressor including a rotor for supplying combustion air thereto, said rotors being connected to each other for joint operation, comprising: a fuel metering valve for regulating fuel flow to said combustion apparatus, a speed governor driven by one of said rotors for controlling the position of said fuel metering valve, means for regulating the speed setting of said speed governor to vary the speed of said rotors, acceleration-deceleration sensing means driven by said rotors for providing a rate of change of speed signal ($dn/dt$), fluid pressure responsive means for sensing the air pressure (P) at the outlet of said compressor, adjustable means controlled by said $dn/dt$ sensing means and said P sensing means, said adjustable means being interposed between said governor and said fuel metering valve and operative to modify the control effect of said governor when said governor is adjusted to a different speed setting by said regulating means, and an acceleration-deceleration ($dn/dt$) anticipating device, said acceleration-deceleration anticipating device being connected to said adjustable means and movable in response to movement of the fuel metering valve to control said adjustable means during the period immediately succeeding the change in speed setting when the joint $dn/dt$ and P signals are of insufficient magnitude to assume control of said adjustable means.

4. Fuel control apparatus for a gas turbine engine having a turbine rotor, fuel combustion apparatus for supplying said turbine rotor with hot motive fluid, means for providing said combustion apparatus with fuel and a compressor including a rotor for supplying combustion air thereto, said rotors being connected to each other for joint operation, comprising: a hydraulically actuated fuel metering valve for regulating fuel flow to said combustion apparatus, a hydraulically actuated speed governor driven by one of said rotors for controlling the position of said fuel metering valve, means for regulating the speed setting of said speed governor to vary the speed of said rotors, acceleration-deceleration sensing means driven by said rotors for providing a rate of change of speed signal ($dn/dt$), fluid pressure responsive means for sensing the air pressure (P) at the outlet of said compressor, a servo mechanism controlled by said $dn/dt$ sensing means and said P sensing means, said servo mechanism being interposed between said governor and said fuel metering valve and operative to modify the control effect of said governor when said governor is adjusted to a different speed setting by said regulating means, a hydraulically actuated acceleration-deceleration ($dn/dt$) anticipating device, said acceleration-deceleration anticipating device being connected to said servo mechanism and movable in response to movement of said fuel metering valve to control said servo mechanism during the period immediately succeeding the change in speed setting when the joint $dn/dt$ and P signals are of insufficient magnitude to assume control of said servo mechanism, said fuel metering valve being movable in opening direction by pressurized liquid delivered thereto by said speed governor and said $dn/dt$ anticipating device being controlled by said pressurized liquid, and emergency valve means disposed between a source of liquid under regulated pressure and said $dn/dt$ anticipating device, said emergency valve means being normally in the closed position but movable to an open position when said fuel metering valve is moved to its maximum open position, whereby said $dn/dt$ anticipating device is conditioned for maximum acceleration anticipation by said liquid regulated pressure.

5. Fuel control apparatus for a gas turbine engine having a turbine rotor, fuel combustion apparatus for supplying said turbine rotor with hot motive fluid, means for providing said combustion apparatus with fuel and a compressor including a rotor for supplying combustion air thereto, said rotors being connected to each other for joint operation, comprising: a fuel metering valve for regulating fuel flow to said combustion apparatus, a hydraulically actuated speed governor driven by one of said rotors for controlling the position of said fuel metering valve, means for regulating the speed setting of said speed governor to vary the speed of said rotors, acceleration-deceleration responsive means driven by said rotors for providing a rate of change of speed signal $(dn/dt)$, a servo valve mechanism controlled by said $dn/dt$ responsive means, said servo valve mechanism being interposed between said governor and said fuel metering valve and operative to modify the control effect of said governor on said fuel metering valve when said governor is adjusted to a different speed setting by said regulating means, and an acceleration-deceleration anticipating device connected to said servo valve mechanism and operable in response to movement of said fuel metering valve to preliminarily control said servo valve mechanism during the period immediately succeeding the change in speed setting in which the $dn/dt$ signal is of insufficient magnitude to assume control of said servo valve mechanism, said fuel metering valve being movable in opening direction by pressurized liquid delivered thereto by said speed governor, said servo valve having a movable member connected to said $dn/dt$ responsive means and to said acceleration-deceleration anticipating device and controlled thereby to modify the value of the pressurized liquid.

6. Fuel control apparatus for a gas turbine engine having a turbine rotor, fuel combustion apparatus for supplying said turbine rotor with hot motive fluid, means for providing said combustion apparatus with fuel and a compressor including a rotor for supplying combustion air thereto, said rotors being connected to each other for joint operation, comprising: a fuel metering valve for regulating fuel flow to said combustion apparatus, a hydraulically actuated speed governor driven by one of said rotors for controlling the position of said fuel metering valve, means for regulating the speed setting of said speed governor to vary the speed of said rotors, acceleration-deceleration responsive means driven by said rotors for providing a rate of change of speed signal $(dn/dt)$, a servo valve mechanism controlled by said $dn/dt$ responsive means, said servo valve mechanism being interposed between said governor and said fuel metering valve and operative to modify the control effect of said governor on said fuel metering valve when said governor is adjusted to a different speed setting by said regulating means, and an acceleration-deceleration anticipating device connected to said servo valve mechanism and operable in response to movement of said fuel metering valve to preliminarily control said servo valve mechanism during the period immediately succeeding the change in speed setting in which the $dn/dt$ signal is of insufficient magnitude to assume control of said adjustable mechanism, said fuel metering valve being movable in opening direction by pressurized liquid delivered thereto by said speed governor, said servo valve having a movable member connected to said $dn/dt$ responsive means and to said acceleration-deceleration anticipating device and controlled thereby to modify the value of the pressurized liquid, said acceleration-deceleration anticipating device comprising a movable abutment responsive to transient unbalanced fluid pressure values in said fuel valve and movable in one direction in response to transient unbalanced fluid pressure tending to open said fuel valve and movable in another direction in response to transient unbalanced fluid pressure tending to close said fuel valve, said movable abutment being connected to said movable servo valve member in a manner to move the latter in a direction effecting a reduction in said transient unbalanced fluid pressure values.

References Cited in the file of this patent

UNITED STATES PATENTS

| | | |
|---|---|---|
| 2,761,495 | Greenland | Sept. 4, 1956 |
| 2,805,543 | Lawry et al. | Sept. 10, 1957 |
| 2,819,757 | Greenland | Jan. 14, 1958 |